July 30, 1963  V. A. ANDERSON  3,099,500
FULL POWER BRAKE VALVE
Filed March 8, 1960
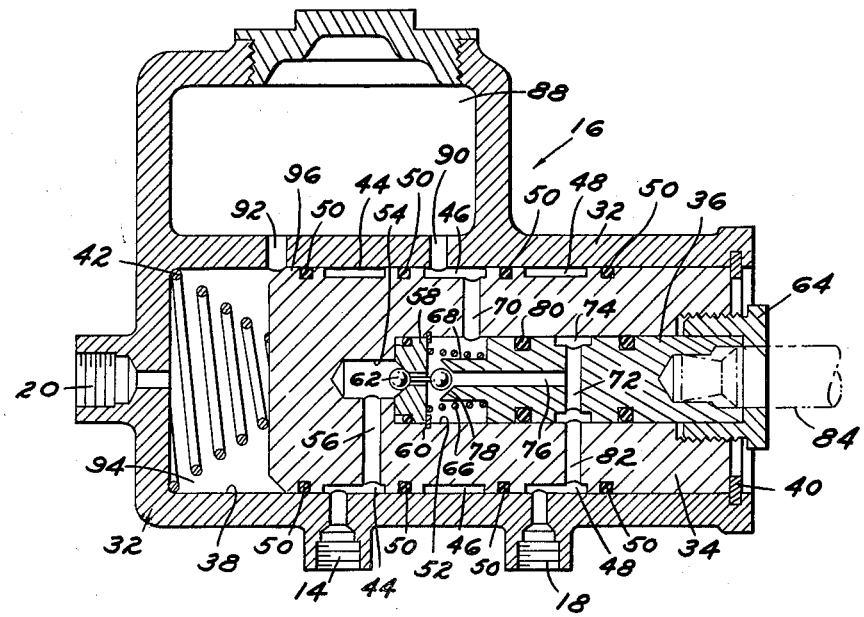
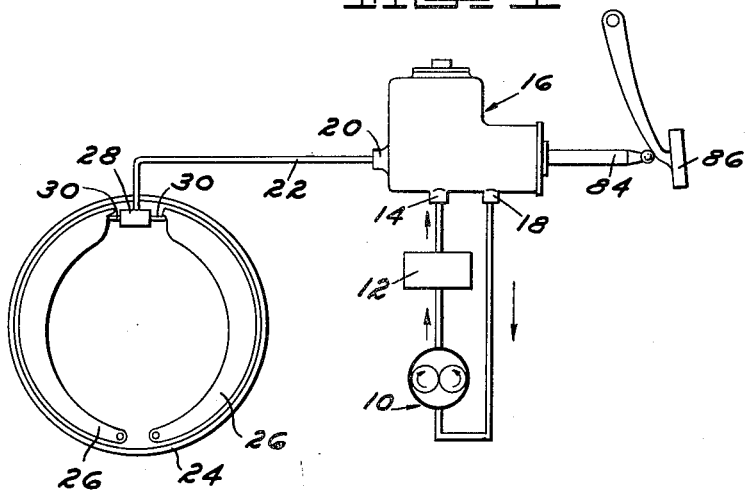
V. A. ANDERSON
INVENTOR.
BY John R. Faulkner
Clifford L. Sadler
ATTORNEYS

United States Patent Office 3,099,500
Patented July 30, 1963

3,099,500
FULL POWER BRAKE VALVE
Vernal A. Anderson, Dearborn, Mich., assignor to Ford Motor Company, Dearborn, Mich., a corporation of Delaware
Filed Mar. 8, 1960, Ser. No. 13,506
5 Claims. (Cl. 303—49)

The present invention relates to a power brake valve for a motor vehicle and more particularly to such a valve having a manual override safety feature.

In the present state of the automotive art, considerable engineering talent is being directed to the problem of reducing the driving effort required of the vehicle operator. For some years, power assist accessories have been in use which supplement the driver's manual effort with power from another source. For example, with a power assist brake the operator is called upon for about 50% of the normal pedal effort required with a fully manual brake.

As a further improvement in the art, systems are being developed for the full power application of brakes. With a full power system an outside source provides all of the energy for applying the brakes. The operator is required merely to activate the system; for example, by manipulation of a foot controlled brake valve. Such a full power system has the advantage of not only reducing the braking effort but also providing an instantly responsive brake. Because the operator is called upon to merely open or close a valve, brake pedal travel may be reduced to a minimum distance.

One limitation of the full power system is the requirement for a safety control in the event of a failure of the power source. The vehicle operator must be able to bring the automobile to a halt even though the engine or the power source which normally activates the brake system has failed.

Therefore, in view of the state of the art as outlined above, it is the principal object of the present invention to provide a full power brake valve for a motor vehicle brake system which has a manual override feature.

More specifically, the present invention provides a brake valve which controls the flow of pressure fluid to the brake cylinders and is concentrically situated within a manually actuatable piston that is movable upon failure of the pressure source to activate the brakes.

These and further objects of the present invention will become more apparent to those skilled in the art from the following description and the accompanying drawing in which:

FIGURE 1 is a diagrammatic representation of a full power vehicle brake system incorporating a brake valve constructed in accordance with the present invention, and FIGURE 2 is a sectional view of the brake valve of FIGURE 1.

Referring now to the drawings for a more detailed description of the present invention, FIGURE 1 discloses a full power vehicle brake applying system which has a pressure source or pump 10. Pressure source 10 is driven by a prime mover not shown and circulates fluid under pressure through a conduit to an accumulator 12. From the accumulator 12 the hydraulic fluid is transmitted to an inlet 14 of a master brake control valve 16. The pump 10 receives fluid by a conduit connected to a return outlet 18 of the valve assembly 16.

The brake valve assembly 16 controls the flow of pressure fluid to a pressure outlet 20 which in turn has a conduit 22 connecting it to the brake mechanism at each of the wheels. As shown in FIGURE 1, such a brake contains the basic components of a brake drum 24, a pair of arcuate brake shoes 26 and a wheel cylinder 28. When pressure fluid is delivered through conduit 22 to the wheel cylinder 28, pistons within the cylinder 28 will act against push rods 30 to force the upper ends of the shoes 26 apart against the drum 24. The forcing of the shoes 26 against the drum 24 affects the desired braking action.

The flow of pressure fluid to the wheel cylinder 28 from the pressure source 10 is controlled by the control valve assembly 16, the construction of which is shown detailed in FIGURE 2.

Valve assembly 16 is comprised of three principal components; an outer housing 32, a manually movable piston 34, and an inner valve element 36 coaxially slidable within the piston 34.

The piston 34 is contained within a bore 38 formed in the housing 32. A snap ring 40 is provided at the right-hand opening of the bore 38 and the piston 34 is held against the ring 40 by coil spring 42 disposed at its left end. During normal full power operation, the piston 34 is maintained in that position.

The piston 34 is provided with a series of three axially spaced apart circumferential grooves 44, 46, and 48. These grooves are separated by lands which contain O-ring seals 50.

The center of the piston 34 is bored out at 52 to receive the valve element 36. A second bore of lesser diameter is provided in the body of the piston 34 at the depth of the bore 52. The smaller bore is indicated by the reference numeral 54.

Annular groove 44 is normally in registry with the pressure fluid inlet 14. A radial passageway 56 in piston 34 joins the groove 44 with the small bore 54, thus permitting the flow of pressure fluid from inlet 14 into the center of the piston 34.

A valve seat piece 58 having a central axial hole is positioned at the depth of the larger bore 52 by a snap ring 60. An O-ring is interposed between the periphery of the valve seat 58 and bore 52 for sealing purposes. A dumbbell shaped element 62 having a pair of spherical ends joined by a thin shank is located with its ends on either side of the valve seat piece 58 and its shank passing through the axial passageway within the body of the valve seat piece 58. When permitted, the dumbbell 62 will move to the right to close the central passageway of the valve seat piece 58 if acted upon by fluid pressure maintained in bore 54.

Valve element 36 is maintained within the bore 52 by means of a threaded cap 64 that is secured in the end of piston 34. Valve element 36 is pressed to a right-hand position against the cap 64 by a coil spring 66 which is interposed between its left-hand end and the valve seat piece 58. The left-hand end of the valve element 36 is necked down at 68. The necked-down portion 68 assists in locating the spring 66 and also permits the flow of fluid to the circumferential groove 46 by means of a radial passageway 70.

Thus, if the dumbbell 62 is moved slightly to the left so as to unseat from piece 58, pressure fluid could pass from the inlet 14 through the groove 44, radial passageway 56, small bore 54, the orifice in valve seat piece 58, past the end portion 68 of valve element 36, through passageway 70 to the groove 46. This sequence constitutes the flow of pressure fluid through a portion of the valve body on its way to the brake as will be more readily understood later.

Valve element 36 is provided with a diametral passageway 72 associated with a circumferential groove 74. An axial passageway 76 joins the diametral passageway 72 with the left-hand end of the valve element 36. The left-hand extremity of element 36 is machined to have a conical valve seat 78 that complements the right end of the dumbbell element 62.

A pair of spaced apart O-rings 80 act to seal the groove 74. A radial passageway 82 in the piston body 34 joins groove 74 of valve element 36 with circumferential groove 48 of piston 34. The latter groove 48 is in communication with the low pressure return or sump fitting 18.

As previously explained, dumbbell 62 prevents the flow of pressure fluid through the orifice of piece 58 with a check valve type action. If the dumbbell element 62 is held unseated from piece 58, then pressure fluid can flow from small bore 54 through the orifice of piece 58 into the annular chamber surrounding the end 68 of the valve element 36. This forcible unseating is done by sliding the valve element 36 within the bore 52 until its end 78 moves the dumbbell 62.

A push rod 84 is fitted into the right-hand end of the valve element 36 and is acted upon by a brake pedal 86. When foot pressure is applied to the pedal 86, it will move through an arc and force the push rod 84 to the left causing the valve element 36 to slide in the bore 52. The end 78 will then contact the dumbbell element 62 and cause its left-hand end to unseat from the valve seat piece 58. At the same time the right-hand ball end of the dumbbell element will seat to close the open end of the axial passageway 76.

The housing 34 is provided with a chamber 88 which is normally in communication with the groove 46 by means of a passageway 90. A second passageway 92 joins the chamber 88 with a second chamber 94 which is formed between the left-hand end of the piston 34 and the bottom of the bore 38 in the housing 32. The pressure outlet 20 is in communication with the second chamber 94.

The operation of the valve assembly 16 for full pressure actuation of the brakes is as follows. When the pedal 86 is depressed and the valve element 36 moves to the left to unseat the dumbbell piece 62, pressure fluid flows through the inlet 14 to bore 54, through the central orifice of piece 58, past the end 68 of the valve element 36, through radial passageway 70, groove 46, and passageway 90 to the chamber 88. The pressure fluid from chamber 88 is then transmitted through 92 to chamber 94 and from there to the brake line conduit 22 by means of the outlet 20. The brake shoes 26 are then applied by the activation of wheel cylinder 28.

When the brake pedal is released, valve element 36 will move to the left under the action of spring 66. Dumbbell piece 62 will function as a check valve and close the orifice in valve seat piece 58. The right-hand end of the dumbbell element 62 will then become unseated from the end 78 of the valve element 36. This will permit a return flow of fluid through the axial passageway 76, diametral bore 72, radial bore 82, and out the return 18. Thus, whenever the element is in its normal right-hand position the dumbbell piece 62 closes off the high pressure side and opens the low pressure return. This is in contrast to the situation where dumbbell valve element 62 is held in a left-hand position in which case the high pressure fluid is permitted to flow to the brake cylinder 28 and the low pressure return circuit starting with passageway 76 is blocked off.

In the event of a power failure, valve assembly 16 contains an override manual operation feature. If the vehicle operator depresses the brake pedal 86 the usual short distance to open the valve element 36 and pressure is lacking, he may overtravel element 36 so that it bottoms against valve seat piece 58. Further movement will cause the normally stationary piston 34 to slide within the bore 38 to the left. After it has moved a short distance, the right-hand-most land 96 of the piston 34 will pass by the passageway 92 so that the chamber 88 and the low and high pressure circuit which are connected to it are closed off. With the piston 34 in this position, fluid is trapped within the chamber 94, brake line 22 and wheel cylinder 28. Further piston 34 travel will cause the fluid in chamber 94 to be pressurized resulting in the activation of wheel cylinder 28 in the conventional manual fashion, thus bringing the vehicle to a halt.

Release of pressure from the pedal 86 will permit the spring 42 to force the piston 34 back to its normal right-hand position. Thus, the valve assembly 16 functions both as a full pressure brake valve and also as a manual brake valve in the event of a fluid pressure failure.

The foregoing description constitutes a detailed embodiment of the preferred form of the present invention, however, this is done for purposes of illustration and not limitation. Other forms of the invention will occur to those skilled in the art which will come within the scope and spirit of the following claims.

I claim:

1. A control assembly for a brake system having a cylindrical bore and a piston slideably received within said bore, a chamber between the depth of said bore and the end of said piston, valve means co-axially slideable within said piston, a fluid pressure source communicable with said chamber, said means having a first position preventing flow of pressure fluid from said source to said chamber, actuating means adapted to move said valve means to a second position for controlled fluid flow from said source to said chamber, a high pressure outlet in said chamber, said piston being slideable by said actuating means to force pressure fluid out of said chamber through said high pressure outlet.

2. A control assembly for a brake system having a cylindrical bore and a piston slideably received within said bore, a chamber between the depth of said bore and the end of said piston, check valve means slideable within said piston, a fluid pressure source communicable with said chamber, said check valve means being pressure responsive to stop the flow of pressure fluid from said source to said chamber, actuating means adapted to unseat said check valve means to permit the flow of pressure fluid from said source to said chamber, a high pressure outlet in said chamber, said piston being slideable by movement of said actuating means to force pressure fluid out of said chamber through said high pressure outlet.

3. A control assembly for a brake system having a cylindrical bore and a piston slideably received within said bore, said piston having a first position defining a chamber between the depth of said bore and the end of said piston, valve means co-axially slideable within said piston, a fluid pressure source communicable with said chamber, said means having a first position preventing the flow of pressure fluid from said source to said chamber, actuating means adapted to move said valve means to a second position for controlled fluid flow from said source to said chamber, a high pressure outlet in said chamber, said piston being slideable to a second position to force pressure fluid out of said chamber through said high pressure outlet, said piston preventing communication between said source and said chamber when in said second position, said actuating means being adapted to move said piston to said second position.

4. A control assembly for a brake system having a cylindrical bore and a piston slideably received within said bore, a chamber between the depth of said bore and the end of said piston, valve means co-axially slideable within said piston, a second chamber communicable with said first mentioned chamber, a fluid pressure source communicable with said second chamber, said valve means having a first position preventing flow of pressure fluid from said source to said second chamber, actuating means adapted to move said valve means to a second position for controlled fluid flow from said source to said second chamber, a high pressure outlet in said first mentioned chamber, said piston being slideable by said actuating means to seal off the communication between said chambers and to force pressure fluid out of said first mentioned chamber through said high pressure outlet.

5. A control assembly for a brake system having a cylindrical bore and a piston slideably received within said bore, a first chamber between the depth of said bore and the end of said piston, check valve means slideable within said piston, a second chamber communicable with said first chamber, a fluid pressure source communicable with said second chamber, said check valve means being pressure responsive to stop the flow of pressure fluid from said source to said second chamber, actuating means adapted to unseat said check valve means to permit the flow of pressure fluid from said source to said second chamber, a high pressure outlet in said first chamber, said piston being slideable by movement of said actuating means to seal off the communication between said chambers and to force pressure fluid out of said first chamber through said high pressure outlet.

References Cited in the file of this patent

UNITED STATES PATENTS

| | | |
|---|---|---|
| 1,662,096 | Zelov | Mar. 13, 1928 |
| 2,136,318 | Rossman | Nov. 8, 1938 |
| 2,170,593 | Moore | Aug. 22, 1939 |
| 2,318,756 | Chouings | May 11, 1943 |
| 2,757,512 | Foreman | Aug. 7, 1956 |
| 2,992,046 | Mortimer et al. | July 11, 1961 |

FOREIGN PATENTS

| | | |
|---|---|---|
| 878,858 | France | Nov. 2, 1942 |

OTHER REFERENCES

German application 1,051,659, printed Feb. 26, 1959 (K 63c 54/02).